(12) United States Patent  (10) Patent No.: US 9,954,464 B2
Fritsch et al.  (45) Date of Patent: Apr. 24, 2018

(54) SWITCHING DEVICE FOR CONTROLLING ENERGY SUPPLY OF A DOWNSTREAM ELECTRIC MOTOR

(71) Applicant: Siemens Aktiengesellschaft, München (DE)

(72) Inventors: Andreas Fritsch, Kuemmersbruck (DE); Hubert Kuhla, Hersbruck (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 523 days.

(21) Appl. No.: 14/442,459

(22) PCT Filed: Nov. 19, 2012

(86) PCT No.: PCT/EP2012/072987
§ 371 (c)(1),
(2) Date: May 13, 2015

(87) PCT Pub. No.: WO2014/075742
PCT Pub. Date: May 22, 2014

(65) Prior Publication Data
US 2015/0349671 A1 Dec. 3, 2015

(51) Int. Cl.
*H02P 6/14* (2016.01)
*H02P 1/02* (2006.01)
(Continued)

(52) U.S. Cl.
CPC .............. *H02P 1/022* (2013.01); *H01H 9/542* (2013.01); *H02P 1/023* (2013.01); *H02P 3/02* (2013.01); *H02M 2001/0006* (2013.01)

(58) Field of Classification Search
CPC ......... H01M 2220/30; H01M 10/0525; H01M 2010/4271; Y02E 60/122; G01R 31/362
See application file for complete search history.

(56) References Cited

U.S. PATENT DOCUMENTS 5,331,223 A * 7/1994 Nishijima .............. H04N 5/268
327/355
5,953,189 A 9/1999 Abot et al.
(Continued)

FOREIGN PATENT DOCUMENTS

CN 101005206 A 7/2007
CN 102013666 A 4/2011
(Continued)

OTHER PUBLICATIONS

Chinese Office Action dated May 20, 2016.
(Continued)

*Primary Examiner* — Shawki S Ismail
*Assistant Examiner* — Zoheb Imtiaz
(74) *Attorney, Agent, or Firm* — Harness, Dickey & Pierce, P.L.C.

(57) ABSTRACT

A switching apparatus includes an energy store and two measuring devices connected to the control apparatus, the energy store being connected in series between the supply connection and the power supply via the first measuring device, the control apparatus can ascertain if the supply voltage attached to the primary side of the power supply falls short of a first voltage threshold value and, via the second measuring device, if the supply voltage of the power supply attached to the secondary side of the power supply falls short of a second voltage threshold value, the control apparatus evaluates the time between falling short of the first voltage threshold value and falling short of the second voltage threshold value.

20 Claims, 1 Drawing Sheet

(51) Int. Cl.
  *H01H 9/54* (2006.01)
  *H02P 3/02* (2006.01)
  *H02M 1/00* (2006.01)

(56) References Cited

U.S. PATENT DOCUMENTS

| | | |
|---|---|---|
| 2007/0063661 A1 | 3/2007 | Galli et al. |
| 2008/0225457 A1 | 9/2008 | Korrek |
| 2009/0129768 A1* | 5/2009 | Tamegai ................ G03B 15/05 396/206 |
| 2012/0281443 A1* | 11/2012 | Wolf ....................... H02M 7/48 363/55 |

FOREIGN PATENT DOCUMENTS

| | | |
|---|---|---|
| JP | 2010063272 A | 3/2010 |
| WO | WO-2011143087 A2 | 11/2011 |

OTHER PUBLICATIONS

International Search Report PCT/ISA/210 for International Application No. PCT/ dated (May 8, 2013).
Written Opinion of the International Searching Authority PCT/ISA/237 for International Application No. PCT/ dated (May 8, 2013).

\* cited by examiner

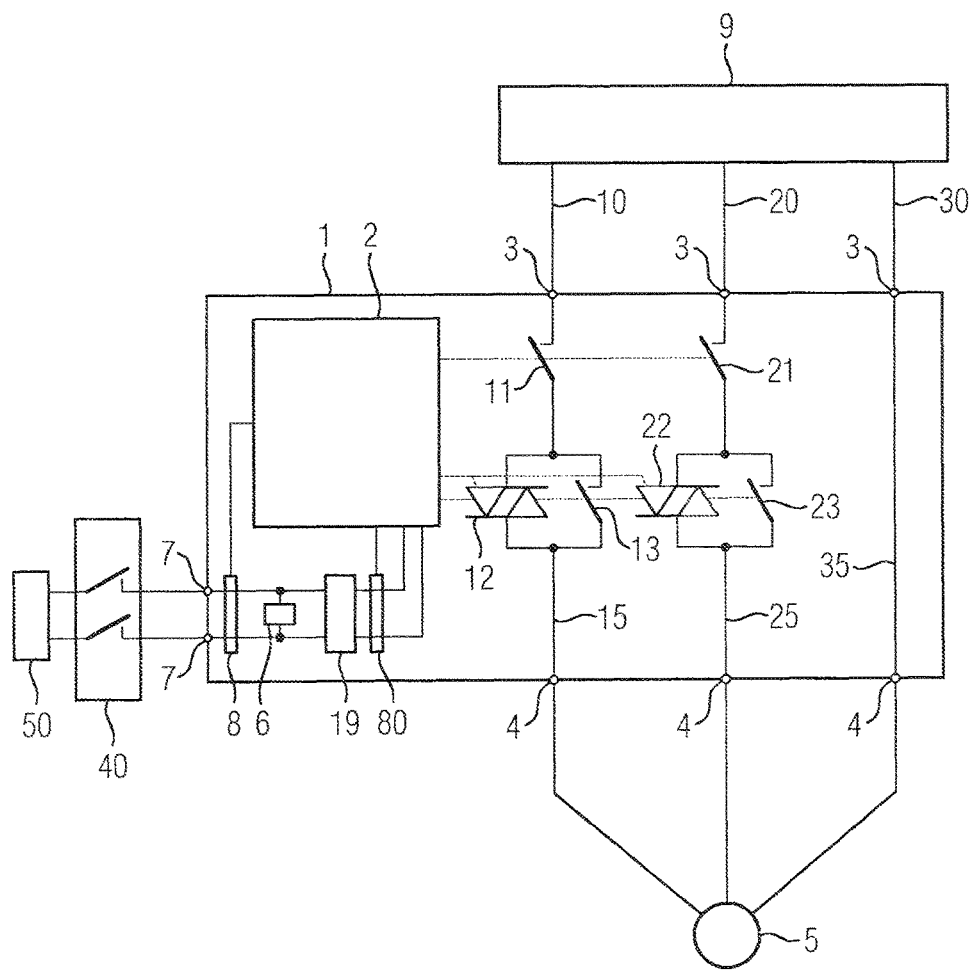

SWITCHING DEVICE FOR CONTROLLING ENERGY SUPPLY OF A DOWNSTREAM ELECTRIC MOTOR

PRIORITY STATEMENT

This application is the national phase under 35 U.S.C. § 371 of PCT International Application No. PCT/EP2012/072987 which has an International filing date of Nov. 19, 2012, which designated the United States of America, the entire contents of which are hereby incorporated herein by reference.

FIELD

At least one embodiment of the invention generally relates to a switching device for controlling the energy feed to a downstream electric motor, together with for a method for the switching device. At least one embodiment of the inventive switching device is, in particular, a motor starter which is used in the context of industrial automation technology. Using the switching device, an electric motor which is connected downstream from the switching device can be controlled. For this purpose, an energy supply for the electric motor which is connected downstream from the switching device is fed through the switching device, so that the electric motor is connected to a supply network. The supply network is, in particular, a low voltage network for an industrial facility (e.g. three phases, 400 Volt, 50 Hertz).

BACKGROUND

For the purpose of controlling the energy supply to the downstream electric motor, the switching device incorporates a control unit and a first current path. A first phase of the supply network is fed to the downstream electric motor via the first current path. The first current path incorporates a first electro-mechanical switch and, connected in series with the first switch, a circuit of a second electro-mechanical switch in parallel with a semiconductor switch. The control unit can output a switching signal for the first switch, for the second switch and for the semiconductor switch, and by these can control the desired switching state of the switches. The first and second switches are, in particular, normally open contact switches which, when a switching signal is applied from the control unit, are held in the closed state. If the switching signal is switched off for the first or second switch then, due to a restoring force (e.g. a spring force which works on a contact of the switch concerned) the switch automatically adopts the open state. Switches of this type are, in particular, relays. When a switching signal is applied by the control unit, the semiconductor switch preferably adopts the electrically conducting state.

The switching device incorporates a supply connection, through which the control unit can draw the energy for the switching signals. Generally, a local supply source is linked to the supply connection of the switching device by way of a wire, so that when the switching device is actively operational a supply voltage is present through the supply connection. Through this supply connection, the switching device draws the energy required for the switching signals. Preferably, the entire internal energy supply of the switching device is drawn through the supply connection.

The switching device is preferably used for the purpose of switching on and off three-phase motors and also single phase alternating current motors. The motors which are connected downstream from the switching device are preferably protected against overload (short-circuit protection and/or thermal overload) by the switching device.

Insofar as the switching device is deployed in safety-critical applications, the switching device must ensure the safe shutdown of the electric motor connected downstream from the switching device.

In the case of switching devices with an emergency shutdown for the motor which is connected downstream from the switching device, one possible shutdown principle is to switch off the supply voltage to the switching device by way of a switching device (e.g. an emergency stop switching mechanism) connected in circuit in the supply line between the supply source and the supply connection. Depending on its method of functioning, switching off the supply voltage causes the electro-mechanical switches of the switching device to automatically move to the off state (i.e. the switches are opened). In this way, when the supply voltage is switched off, the energy feed to the motor through the switching device is disconnected, so that the motor is reliably switched off. Due to the disconnection of the supply source and the automatic opening of the switches, a shut-down arc forms at the switches, causing heavy wear to the switches, so that there is generally a limit to the number of such switching cycles for the switching devices.

A circuit for providing an electrical load in a protected manner is known from U.S. Pat. No. 5,953,189, which incorporates a circuit breaker and a bidirectional electronic switch connected in series. The circuit also has a shunt contactor which ensures the continuous operation of the load, and a command device, which assigns turn-on and turn-off signals to a command electrode of thyristors. As a result, the thyristors are set as to be conductive or not conductive during a start-up phase of a motor. As soon as the rated speed has been reached at the motor, the shunt contactor is closed, so that the current flow through the thyristors becomes zero. The command device is connected via a terminal to a main current path C which also supplies it with energy.

The Japanese patent application JP 2010063272 A discloses a power supply unit which is embodied to provide a constant DC voltage. The power supply unit is provided with an input-side voltmeter apparatus, which monitors a provided DC voltage. Furthermore, the power supply unit has a capacitor, which is connected to a control unit. The capacitor acts as an energy buffer during a switching operation in the power supply unit if the provided DC voltage falls below a threshold.

A chiller system is known from WO 2011/143087 A2, said chiller system incorporating a motor, which is controlled by a control unit. The motor is driven by an AC voltage via a frequency converter, which has a current converter and a first inverter. The first inverter and the current converter are connected to one another via a DC bus having a capacitor in this case. A second inverter is connected via the DC bus, via which inverter the control unit is supplied with power. Here, the control unit is connected to a frequency converter controller, which is coupled to the first inverter. If the AC voltage supply is interrupted, the inverter and the control unit in the DC bus are supplied with power via the capacitor, so that the operation of the motor is maintained for five to 15 minutes.

SUMMARY

At least one embodiment of the invention provides an improved switching device, which in particular ensures the orderly functioning of the switching device itself.

At least one embodiment of the invention is directed to a mechanism, i.e. by a switching device with a control unit, a supply connection, a power supply unit and a first current path which incorporates a first electro-mechanical switch and, connected in series with the first switch, a circuit with a second electro-mechanical switch in parallel with a semiconductor switch, wherein the control unit can output a switching signal for the first switch, for the second switch and for the semiconductor switch, wherein the supply connection is linked to the power supply unit and the control unit draws the energy for the switching signals through the power supply unit, wherein the switching device incorporates an energy store and two measurement devices linked to the control unit, wherein the energy store is connected in circuit between the supply connection and the power supply unit, so that the supply of energy for the switching device, effected through the supply connection, is buffered internally in the device by way of the energy store, wherein the control unit can determine, by way of the first measurement device, any drop in the supply voltage present at the primary side of the power supply unit below a first voltage threshold value, wherein the control unit can determine, by way of the second measurement device, any drop in the supply voltage present at the secondary side of the power supply unit below a second voltage threshold value, wherein the control unit is designed in such a way that it evaluates the time between the fall below the first voltage threshold value up until the fall below the second voltage threshold value. By evaluating of the time between the fall below the first voltage threshold value up until the fall below the second threshold value, the control unit will monitor the functional state of the internal energy store. If the time falls below a stored critical time value, then the control unit preferably outputs a corresponding signal. By the evaluation, by way of the control unit, of the time between the fall below the first voltage threshold value up until the fall below the second voltage threshold value it is possible, in particular, to monitor the deterioration of the energy store.

At least one embodiment of the invention is directed to a method, i.e. a method for a switching device which incorporates a control unit, a supply connection, a power supply unit and a first current path, wherein the first current path incorporates a first electro-mechanical switch and, connected in series with the first switch, a circuit with a second electro-mechanical switch in parallel with a semiconductor switch, wherein the control unit can output a switching signal for the first switch, for the second switch and for the semiconductor switch, wherein the supply connection is linked to the power supply unit and the control unit draws the energy for the switching signals through the power supply unit, wherein the switching device incorporates an energy store and two measurement devices linked to the control unit, wherein the energy store is connected in circuit between the supply connection and the power supply unit, so that the supply of energy for the switching device, effected through the supply connection, is buffered internally in the device by way of the energy store, wherein the control unit determines, by way of the first measurement device, any drop in the supply voltage present at the primary side of the power supply unit below a first voltage threshold value and determines, by way of the second measurement device, any drop in the supply voltage present at the secondary side of the power supply unit below a second voltage threshold value, whereby the control unit evaluates the time between the fall below the first voltage threshold value up until the fall below the second voltage threshold value. The control unit is designed such that it emits a signal if the time between the fall below the first voltage threshold value up until the fall below the second threshold value falls below a critical time value.

The control unit measures, in particular, the time from the drop below the first voltage threshold value up until the drop below the second voltage threshold value. If the time from the drop below the first voltage threshold value up until the drop below the second voltage threshold value is less than a critical time value, which is in particular stored in the control unit, then the control unit outputs a signal. In this way, the deterioration of the energy store can be monitored. By way of this critical time value, in particular, a time duration is characterized at which a supply of energy internally within the device, adequate for the output of the signal for the first and second steps, is ensured by the energy store or is endangered.

As soon as the energy store no longer has the capacity for a regular shutdown (carrying out the first and second steps) in an orderly fashion (e.g. because of aging), there is a drop below the critical time value. At this point, the control unit outputs a signal. By way of this signal a device error is preferably generated, to prevent the switching device from being switched on again, an LED or a display on the switching device is activated and/or a diagnostic message output on a local device (e.g. a higher level controller). In this way, operational staff can be informed in good time as to the maintenance situation and can consequently react appropriately.

Advantageous developments of the invention are specified in the dependent claims.

BRIEF DESCRIPTION OF THE DRAWINGS

In what follows, the invention and embodiments of the invention are described and explained in more detail by reference to the example embodiment shown in the FIGURE.

The FIGURE shows a schematic representation of a system for the safe operation of an electric motor 5. The system incorporates a power supply system 9, the electric motor 5, a switching device 1, a supply source 50 and an emergency stop mechanism 40.

DETAILED DESCRIPTION OF THE EXAMPLE EMBODIMENTS

When the electro-motor which is connected downstream from the switching device is actively operational, the energy feed for the electro-motor is conducted via the first current path of the switching device.

When the switching signal from the control unit is present, the first and second switches adopt their closed switching state. If the switching signal is switched off at the first and/or the second switch, i.e. no switching signal is present at the switch concerned, then the switch concerned automatically adopts the open switching state. When there is a switching signal there is, in particular, a voltage present across the control current circuit of the switch, in particular approx. 12 Volt. When there is no switching signal there is, in particular, no voltage present across the control current circuit of the switch.

The first measurement device is, in particular, arranged in the region between the supply connection and the power supply unit. By way of the first measurement unit, the control unit can monitor the energy supply on the primary side of the power supply unit (i.e. the electrical link from the power supply unit to the supply connection). By way of the first measurement device the voltage present, in particular, on the primary side of the power supply unit is determined.

The second measurement device is arranged, in particular, in the region between the power supply unit and the control unit. By way of the second measurement unit, the control unit can monitor the energy supply on the secondary side of the power supply unit (i.e. the electrical link from the power supply unit to the control unit). By way of the first measurement device the voltage present, in particular, on the secondary side of the power supply unit is determined.

The supply connection preferably effects only the internal device energy supply for the switching device.

Preferably, for the orderly operation of the switching device, approx. 24 Volts is present at the supply connection.

The power supply unit of the switching device converts, in particular, the voltage applied at the supply connection into another voltage.

The semiconductor switch is preferably a triac or two thyristors connected antiparallel.

If the supply connection of the switching device is connected correctly to an external supply source, there is a voltage present via the supply connection. In this way, the power supply unit, and through it the control unit, are supplied with energy.

The energy store, which is in particular formed of at least one capacitor, is connected in between the supply connection and the power supply unit, so that internally within the device it buffers the energy supply for the switching device, which is effected via the supply connection. The energy store is, in particular, charged up by the voltage applied at the supply connection.

By way of the first measurement device, the control unit can detect any drop in the voltage, on the primary side of the power supply unit, below a first voltage threshold value. This first voltage threshold value characterizes, in particular, a state of the switching device in which the energy supply to the power supply unit through the external supply source is endangered, or is no longer present. Such a state is, for example, brought about by an interruption in the electrical link from the supply connection to the supply source.

If the electrical link from the supply connection to the supply source is interrupted, then the power supply unit is supplied with energy solely internally by the charged-up energy store. Such a state is detected by the control unit by a drop in the supply voltage, in the region of the primary side of the power supply unit, below the first threshold value. The internal energy supply within the device by way of the energy store can, however, only be maintained for a certain length of time.

By monitoring the voltage on the secondary side of the power supply unit, by way of the second measurement device, it is possible to draw conclusions about the progress of the discharge of the energy store.

Preferably, the control unit monitors whether the energy store ensures, for a predetermined period of time, an adequate energy supply internally within the device for the power supply unit, in particular for the control unit. By reference to an evaluation of the time from when the voltage falls below the first voltage threshold value to when the voltage falls below the second voltage threshold value, the control unit can monitor the orderly functional state of the energy store.

The control unit preferably outputs a signal, or prevents the downstream electromotor from being switched on again, if the time, from when the voltage falls below the first voltage threshold value up until when the voltage falls below the second voltage threshold value, lies below a critical time value.

In one advantageous form of embodiment of the invention the control unit is designed in such a way that, if it is determined that the voltage on the primary side of the power supply unit has fallen below the first voltage threshold value, it uses the energy of the energy store:

in a first step to switch the semiconductor switch so that it is electrically conducting, and then to open the second switch;

after the first step, in a second step to switch the semiconductor switch to be electrically non-conducting, and then to open the first switch.

After the control unit has determined, by way of the first measurement device, that the voltage has fallen below the first voltage threshold value, the execution of the first and second steps is effected automatically by the control unit.

By way of the first and second measurement devices, the control unit can monitor the energy supply provided for the switching signal of the control unit. Because the energy flow in the area of the electrical link between the supply connection and the power supply unit is being monitored by way of the first measurement device, it is possible to monitor the voltage of the supply source fed through the supply connection directly at the switching device. In this way, it is possible for the control unit to react immediately to a drop in the voltage at the supply connection.

The monitoring of the energy supply effected through the supply connection by way of the measurement device makes it possible, if the supply voltage drops into a critical range, which is preferably stored in the control unit or the measurement device, to carry out a controlled shutdown of the energy supply effected via the first current path to the electric motor connected downstream. The critical range of the supply voltage is distinguished from the correctly functioning range of the supply voltage, in which an orderly energy supply for the switching device is present via the supply connection, by way of the first voltage threshold value. The first voltage threshold value is set, in particular, such that if the first voltage threshold value is exceeded then the energy supply via the supply connection is adequate for the switching device, thus ensuring that the control unit outputs an orderly switching signal, and if the voltage falls below the first voltage threshold value the energy supply effected via the supply connection is one which endangers the output of an orderly switching signal by the control unit, in particular makes it impossible.

The critical range preferably characterizes a voltage range at the supply connection which lies below about 70%, preferably about 50%, of the maximum permissible voltage which may be connected to the supply connection. The first voltage threshold value then lies in the range of about 50%-70% of the maximum permissible voltage which may be connected to the supply connection.

If, by way of the first measurement device, a critical energy supply has been detected by the control device (a drop below the first voltage threshold value is detected), then in a first step the semiconductor switch is automatically switched, by way of the control unit, to be electrically conducting and the second switch is opened after the closure of the semiconductor switch (in the first step, the first switch remains closed). After the first step, in a second step the control unit automatically first switches the semiconductor switch to be electrically non-conducting and then opens the first switch.

The control unit draws from the energy store the energy required for the output of the necessary switching signals for the first and second steps.

If the voltage present at the supply connection drops into the critical range, so that the voltage falls below the first voltage threshold value, then the output by the control unit of the switching signals necessary for the first and second steps is assured by the energy buffered in the energy store. Because the energy store is charged up directly by way of the voltage present at the supply connection it is possible, with an appropriate dimensioning of the energy store, to effect a controlled shutdown of the electric motor which is connected downstream (the first and second steps are performed), preferably at a constant voltage level. The voltage drop on the secondary side of the power supply unit preferably occurs only after the first and second steps have been performed.

The automatically controlled shutdown of the electric motor which is connected downstream, by way of the first and second steps, is effected in particular directly after it has been determined that the voltage has dropped below the first voltage threshold value.

One advantage resides in the fact that improved shutdown behavior can be achieved with low additional hardware costs. In particular, in terms of emergency shutdowns via the supply connection it is possible to achieve an increased number of switching cycles for the switching device. The wear at the switches which normally occurs from a shutdown of the supply voltage can be prevented by the controlled shutdown. The energy for the switching signal required for this purpose is made available by the energy store. Because the energy store is arranged on the primary side of the power supply unit (the side towards the supply connection), the internal energy buffering within the device can be improved.

In a further advantageous form of embodiment of the invention, the control unit is designed in such a way that it determines, by way of the first measurement device, the voltage on the primary side of the power supply unit and defines the critical time value on the basis of the voltage which has been determined.

With a knowledge of the energy consumed by the switching device in outputting the signals for the first and second steps, and a knowledge of the level of the supply voltage before the voltage drop, it is possible to determine a minimum discharge time which the energy store (e.g. the buffer capacitor/s) must have. This minimum permissible discharge time, which is characterized by the critical time value, is used for monitoring the orderly functioning of the energy store (e.g. the capacity of the buffer capacitor).

Because the level of the voltage present on the primary side of the power supply unit can be determined before the voltage failure, it is possible to reach a conclusion as to the charge state of the energy store, so that the critical time value can be determined from this. The critical time value can, for example, be calculated using an algorithm stored in the control unit which takes into account the level of the voltage present on the primary side of the power supply unit before the voltage failure. However, it is also conceivable that the critical time value is stored in a table in the control unit, so that the critical time value is determined as a function of the voltage determined by way of the measurement device before the voltage failure.

If the time, from when the voltage falls below the first voltage threshold value up until when the voltage falls below the second voltage threshold value, lies below the critical time value, then the assumption is made that the capacity of the energy store has become too limited to be able to carry out the controlled shutdown in an orderly manner.

This approach enables the energy store to be monitored, and the switching device to be reliably protected against the negative consequences (bonding/contact welding of the first and second electro-mechanical switches). If a capacitor is used as the energy store, it is possible for example to recognize aging of the capacitor.

In a further advantageous form of embodiment of the invention, the control unit is designed in such a way that it determines the critical time value as a function of the state of the motor which is connected downstream (electric motor switched on/off).

In a further advantageous form of embodiment of the invention, the energy store can be charged up through the supply connection. The energy store preferably incorporates at least one capacitor which has an electrically conducting link to the supply connection. It is also conceivable that several capacitors are used as the energy store.

In a further advantageous form of embodiment of the invention, the energy store is designed in such a way that it ensures that the control unit can output the required switching signals for the first and second steps. Hence, the output of the first and second switching signals through the control unit is possible by the sole means of the energy buffered in the energy store.

In a further advantageous form of embodiment of the invention, the switching device incorporates a second current path, which incorporates a first electro-mechanical switch and, connected in series with this first switch, a circuit of a second electro-mechanical switch in parallel with a semiconductor switch, wherein the control unit can output a switching signal for the first switch, for the second switch and for the semiconductor switch in this second current path, wherein the control unit is designed in such a way that, if the energy supply which is monitored by way of the measurement device falls into a critical range, it uses the energy of the energy store:

in a first step to switch the semiconductor switch in the second current path so that it is electrically conducting, and then to open the second switch in the second current path, after the first step, in a second step to switch the semiconductor switch in the second current path to be electrically non-conducting, and then to open the first switch in the second current path.

The actuation of the second current path by way of the control unit is preferably effected in an analogous way to the first current path. The second current path is preferably designed in an analogous way to the first current path.

The switching device can in addition incorporate a third current path. The third current path can be designed in an analogous way to the first and second current paths. The actuation of the switches in the third current path can also be effected in a way analogous to the first current path.

In a further advantageous form of embodiment of the invention, the control unit is designed in such a way that, in the second step, it switches the semiconductor switch into the electrically non-conducting state as the current for the energy feed which it provides passes through zero. This interrupts the energy supply to the electric motor, so that the first switch for the current path concerned can then be opened in a zero-current state. The switching off of the energy supply to the electric motor can thus be effected without the formation of electric arcs at the electro-mechanical switches concerned. The degradation of the switches which would otherwise occur is avoided.

In a further advantageous form of embodiment of the invention, a system for the safe operation of an electric motor incorporates the switching device described, a supply source and switching equipment, wherein the switching equipment is connected into the supply line from the supply source to the supply connection of the switching device in such a way that actuation of the switching equipment interrupts the energy supply, effected by the supply source, to the switching device. The switching equipment is, for example, an emergency stop device.

The switching device 1 is linked on its input side to the power supply system 9 by its three connection points 3, and on its output side with the electric motor 5 by its three connection points 4. The electric motor 5 is an asynchronous motor. The power supply system 9 is a three-phase alternating current system of an industrial low-voltage switchgear facility. The switching device 1 is a motor starter 1, by which the energy feed can be controlled to the electric motor 5, which is connected downstream of it.

A first phase 10 of the power supply system 9 is linked by way of a wire to the connection point 3 on the input side, and internally within the device is fed via a first current path 15 of the motor starter 1 to the connection point 4 on the output side and is then fed, by way of a further wire, to the electric motor 5. Internally within the device, the first current path 15 of the motor starter 1 links the connection point 3 on the input side of the motor starter 1 to the connection point 4 on the output side of the motor starter 1. The first current path 15 incorporates a first electro-mechanical switch 11, a semiconductor switch 12, in this case a triac, and a second electro-mechanical switch 13. The first switch 11 is connected in series to the parallel circuit comprising the semiconductor switch 12 and the second switch 13. Consequently the first phase 10 of the power supply system 9 is fed to the electric motor 5 via the first current path 15.

A second phase 20 of the power supply system 9 is linked by way of a wire to the connection point 3 on the input side, and internally within the device is fed via a second current path 25 of the motor starter 1 to the connection point 4 on the output side and is then fed, by way of a further wire, to the electric motor 5. Internally within the device, the second current path 25 of the motor starter 1 links the connection point 3 on the input side of the motor starter 1 to the connection point 4 on the output side of the motor starter 1. The second current path 25 incorporates a first electro-mechanical switch 21, a semiconductor switch 22, in this case a triac, and a second electro-mechanical switch 23. The first switch 21 is connected in series to the parallel circuit comprising the semiconductor switch 22 and the second switch 23. Consequently the second phase 20 of the power supply system 9 is fed to the electric motor 5 via the second current path 25.

A third phase 30 of the power supply system 9 is linked by way of a wire to the connection point 3 on the input side, and internally within the device is fed via a third current path 35 of the motor starter 1 to the connection point 4 on the output side and is then fed, by way of a further wire, to the electric motor 5. Internally within the device, the third current path 35 of the motor starter 1 links the connection point 3 on the input side of the motor starter 1 to the connection point 4 on the output side of the motor starter 1. The motor starter 1 described is a 2-phase controlled motor starter 1, so that the third current path forms a constant electrical contact within the device between the input side and output side connection points 3,4. However, it is also conceivable that the third current path 35 also incorporates at least one switch or is constructed in an analogous way to the first and/or the second current path 15,25 of the motor starter 1.

The motor starter 1 incorporates a control unit 2 by which the switch settings of the electro-mechanical switches 11,13, 21,23 and the semiconductor switches 12,22 are controlled. For this purpose, the control unit 2 can output switching signals to the switches 11,12,13,21,22,23. A voltage is applied at the switches 11,12,13,21,22,23 by the switching signal. The electro-mechanical switches 11,13,21,23 are subject to a spring force, so that they must be actuated by the switching signal in order to hold the closed position, because they would otherwise automatically adopt the opened switching state. I.e., as soon as the switching signal is removed from the electro-mechanical switches 11,13,21,23, they automatically adopt the opened switch setting. By way of the control unit 2, the semiconductor switch 12,22 concerned can be switched into an electrically conducting state and an electrically non-conducting state (blocked state). In the electrically non-conducting state of the semiconductor switches 12,22, the transmission of energy via the semiconductor switches 12,22 is blocked.

The first electro-mechanical switches 13,23 are the normally open contact switches of a first relay. The second electro-mechanical switches 11,21 are the make contacts of a second relay. However, it is also conceivable that the individual switches or only the first or only the second switches 11,13,21,23 are actuated by way of a separate relay.

The motor starter 1 draws its internal energy supply through its supply connection 7. For this purpose, the supply connection 7 is linked by way of two wires to a supply source 50 which provides, for example, approx. 24 Volts. Hence, when an electrically conducting link exists to the supply source 7, a supply voltage of approx. 24 Volts is present. By way of the electrical energy drawn via the supply connection 7, the control unit 2 can output the required switching signals to the relevant switches 11,12,13,21,22,23.

Within the motor starter 1, the supply connection 7 has an electrically conducting link to a power supply unit 19 in the switching device 1. The power supply unit 19 adjusts the voltage obtained from the voltage source 50 via the supply connection 7 in such a way that the control unit 2 can draw the appropriate electrical voltage for the switching signals through the power supply unit 19.

The motor starter 1 incorporates in addition an energy store 6, which is integrated into the electrically conducting link from the supply connection 7 to the power supply unit 19. The energy store 6 is a capacitor, which is charged up via the supply connection 7. The energy store 6 can buffer the energy supply to the power supply unit 19. If the energy supply for the switching device from the supply source 50 fails, then the energy supply to the power supply unit 19 is buffered by way of the energy store 6 as determined by the capacity of the energy store 6; i.e. it is maintained for a short time. The capacity of the energy store 6 is arranged in such a way that the energy supply for the power supply unit 19 is assured by the sole means of the energy in the energy store 6 for so long that the control unit 2 can execute a controlled shutdown of the consumer 5 which is connected downstream of it (execution of the first and second steps).

Arranged between the supply connection 7 and the power supply unit 19 is a first measurement device 8 of the motor starter 1. By way of this first measurement unit 8, the control unit 2 can monitor on its primary side the supply voltage provided through the supply connection 7 to the power supply unit 19. In doing so, the voltage determined by way of the measurement device 8 is compared with a first voltage threshold value stored in the switching device 1.

The first voltage threshold value lies at 50% of the maximum permissible voltage which may be connected to the supply connection 7. If the voltage determined lies above the first voltage threshold value, then the energy supply for the switching device 1 effected through the supply connection 7 is sufficient to ensure an orderly output of signals by the control unit 2. If however the voltage determined drops below the first voltage threshold value, then the energy supply effected through the supply connection 7 is such as to endanger the orderly output of signals by the control unit 2. The energy supply effected through the supply connection 7 is thus in the critical range. If the monitoring of the supply voltage by way of the first measurement device 8 determines that a voltage less than 50% of the maximum permissible voltage which may be connected to the supply connection 7 is present at the supply connection 7, then the control unit 2 immediately executes a controlled shutdown, using the energy buffered by the energy store 6.

The emergency stop switching mechanism 40 is arranged between the supply source 50 and the motor starter 1 in such a way that it can disconnect the energy supply to the motor starter 1 effected through the two wires. For this purpose, the emergency stop switching mechanism 40 incorporates in each case two switching elements, each of which can disconnect one wire.

Provided that an orderly supply voltage is present at the supply connection 7, the motor starter 1 can establish an energy supply for the electric motor 5 connected downstream of it. The supply voltage determined by way of the first measurement device 8 lies above the first voltage threshold value, and hence not in the critical range.

If an electric motor 5 is operating within its rated conditions, then within the motor starter 1 the first switches 11,21 are closed, the semiconductor switches 12,22 are switched to be non-conducting, and the second switches 13,23 are closed. One possible shutdown principle for the electric motor 5 connected downstream from the motor starter 1 is to switch off the supply voltage for the motor starter 1 by way of the emergency stop switching mechanism 40 which is connected in between the supply source 50 and the supply connection 7. To do so, the emergency stop switching mechanism 40 is actuated, so that it opens at least one of its switching elements.

If such an actuation of the emergency stop switching mechanism 40 occurs, then there is no voltage present at the supply connection 7. The supply voltage on the primary side of the power supply unit 19 drops, so that it drops below the first voltage threshold value. This change of status is detected by the control unit 2 by way of the first measurement device 8, so that the control unit 2 thereupon automatically carries out a controlled shutdown of the electric motor 5 connected downstream of it. The energy for the output of the switching signals required for this is assured by the energy store 6. Consequently, the power supply unit 19, and through it the control unit 2, continue to be supplied with energy by way of the energy buffered in the energy store 6.

During a controlled shutdown of the downstream motor 5, in a first step the control unit 2 switches the semiconductor switches 12,22 into the electrically conducting state. The first switches 11,21 continue to be actuated by way of a switching signal from the control unit 2, so that they remain in the closed position. In accordance with their function, the second switches 13, 23 automatically fall into their open state because the switching signal at the first relays have been switched off. The energy supply to the electric motor 5 thus continues to be effected through the motor starter 1. During the first step by the control unit 2, the energy required for the switching signals which must be output (semiconductor switches 12,22 and first switches 11,21) is provided by the energy store 6.

In a second step which follows on from the first step, the control unit 2 switches the semiconductor switches 12,22 into an electrically non-conducting state as the current passes through zero. Consequently, there is an arc-free interruption in the energy supply over the first and second current paths 15,25. This switching operation takes place immediately after it is ensured that the second switches 13,23 are open. As soon as the energy supply via the semiconductors 12,22 has been disconnected, the energy supply to the electric motor 5 which is connected downstream is disconnected. After it has been ensured that the energy supply via the semiconductor switches 12,22 has been disconnected, the switching signal for the second relay, and hence for the first switches 11,21 is switched off. In accordance with their function the first switches 11,21 automatically fall into their open state because the switching signals at the second relays have been switched off. The first switches 11,21 are thus opened in the zero-current state. The energy for the switching signals which must be output by the control unit 2 during the second step is provided by the energy store 6.

By providing adequately sized buffering of the supply voltage in the energy store 6 and by the internal monitoring, by way of the first measurement device 8, of the supply voltage present at the supply connection 7 it is possible, when the supply voltage is switched off, to effect a controlled disconnection of the energy supply to the electric motor 5 which is connected downstream, without this resulting in arc formation at the switches 11,13,21,23. The deterioration of the switching device 1 can thus be minimized.

If, due to the failure or switching off of the supply voltage, the supply voltage detected by the first measurement device 8 drops below the prescribed voltage threshold value, then the control unit 2 immediately initiates a controlled shutdown of the electric motor 5 (execution of the first and second steps). This controlled shutdown preferably corresponds to the shutdown procedure which the switching device 1 executes through the control unit 2 in the case of a normal shutdown procedure (in-service shutdown of the electric motor 5 via the control input).

The buffering by the energy store 6 is designed in such a way that adequate energy is available for actuating the switches 11,12,13,21,22,23 up until the end of the controlled shutdown procedure. In this way it is possible, even in the case of an emergency shutdown, to carry out a normal shutdown procedure without additionally loading the mechanical switches 11,13,21,23. Hence, a wear-free shutdown takes place in the case of an emergency stop which is produced by the switching off of the supply voltage. The controlled shutdown procedure using wear-free semiconductor switches 12,22 and the buffering of the supply voltage for the duration of the controlled shutdown procedure enables a significantly increased service life to be achieved for the mechanical switches 11,13,21,23, and hence for the entire switching device 1.

Because the energy buffering on the primary side of the power supply unit 19 (facing the supply connection 7) is effected by way of the energy store 6 it is possible, in the event of a voltage drop at the supply connection 7, the secondary side of the power supply unit 19 can maintain its voltage level constant up to a certain point in time. In this way, it is possible to carry out the shutdown at a constant voltage level throughout. The voltage interruption on the secondary side preferably does not occur until after the end of the controlled shutdown sequence (first and second steps). Because the energy store 6 is arranged on the primary side it is possible, unlike an arrangement of the energy store 6 on the secondary side of the power supply unit 19, to detect a voltage drop at the supply connection 7, and hence to detect the critical range more quickly, so that the controlled shutdown sequence can be initiated earlier. The emergency shutdown is thus initiated earlier. This improves the reliability of the system.

Preferably, if the critical range is entered, the buffered energy in the energy store 6 is in addition used to issue, via a communication facility of the switching device 1, a diagnostic message (e.g. a report of a normal shutdown) to a device unit (e.g. a higher-level controller) linked to the switching device.

The switching device 1 incorporates in addition a second measurement device 80 which is linked to the control unit 2, which is arranged in such a way that the control unit 2 can monitor the supply voltage on the secondary side of the power supply unit 19 by way of the second measurement device 80.

Also stored in the switching device, in particular in the control unit 2, is a critical time value and a second voltage threshold value, which is lower than the first voltage threshold value.

By evaluating the time duration from when the voltage drops below the first voltage threshold value up until when it drops below the second voltage threshold value, the control unit 2 can draw a conclusion as to the functional state of the energy store 6. For this purpose, the control unit 2 compares the time duration it has determined (from the drop below the first voltage threshold value up until the drop below the second voltage threshold value) against the critical time value. If the time duration determined lies above the critical time value, then the functional state of the energy store 6 is correct, i.e. the output of the switching signals for the first and second steps is guaranteed by the energy buffered in the energy store 6. However, if the time duration determined lies below the critical time value, then the output of the switching signals for the first and second steps by the buffered energy in the energy store 6 is endangered. Such a state can arise due to ageing of the capacitor in the energy store 6.

If the evaluation by the control unit determines that the time duration from the drop below the first voltage threshold value up until the drop below the second voltage threshold value lies below the critical time value, then the switching device 1 issues a warning signal, so that the user can detect this state.

The critical time value is not a fixed time value, but is determined as a function of the supply voltage before the voltage drop, as determined by the first measurement device 8, together with the present operational state (switched on/off) of the electric motor 5 which is connected downstream. The critical time value is determined by way of a tabular listing stored in the control unit. However, it is also conceivable that the critical time value is determined by way of an algorithm stored in the control unit 2, which takes into account the above values.

In the case of a tabular listing, the following values are, in particular, stored:
voltage value on the primary side of the power supply unit 19 before the voltage failure (i.e. when the energy supply from the supply source 5 was orderly); e.g.:
scenario A: greater than 24 Volt/scenario B: less than 24 Volt and greater than 20 Volt/scenario C: less than 20 Volt,
critical time value when the electric motor 5 is switched off; e.g.: scenario A: 150 ms/scenario B: 120 ms/scenario C: 100 ms,
critical time value when the electric motor 5 is switched on; e.g.: scenario A: 100 ms/scenario B: 80 ms/scenario C: 60 ms.

The critical time value is determined by the control unit 2 as a function of the voltage value determined to be the present on the primary side of the power supply unit 19 before a voltage drop, and of the operational state of the electric motor which applied when the voltage dropped below the first voltage threshold value.

For example, if a voltage value of 28 Volts is present on the primary side of the power supply unit 19 before the voltage drop (scenario A) and the motor is switched on, then the critical time value is 100 ms.

If there is a drop below the critical time value, the capacity of the buffer capacitor 6 is so seriously degraded, e.g. due to aging of the capacitor 6, that a normal shutdown (first and second steps) can no longer be reliably executed in the event of an emergency stop. A corresponding warning signal is output by the control unit 2. By way of this warning signal, a device error is generated, which in particular prevents a closing of the switches 11,12,13,21,22,23.

The invention claimed is:

1. A switching device, comprising:
   a control unit;
   a supply connection;
   a power supply unit; and
   a first current path, incorporating a first electro-mechanical switch and, connected in series with the first switch, a circuit incorporating a second electro-mechanical switch in parallel with a semiconductor switch, wherein the control unit is configured to output a switching signal for the first switch, for the second switch and for the semiconductor switch, wherein the supply connection is linked to the power supply unit and the control unit is configured to draw the energy for the switching signals through the power supply unit, wherein the switching device incorporates an energy store and two measurement devices linked to the control unit, wherein the energy store is connected in between the supply connection and the power supply unit, so that an energy supply for the switching device effected through the supply connection is buffered internally within the device by way of the energy store, wherein the control unit is configured to determine by way of the first measurement device any drop in the supply voltage, present at the primary side of the power supply unit, below a first voltage threshold value, wherein the control unit is configured to determine by way of the second measurement device any drop in the supply voltage, present at the secondary side of the power supply unit below a second voltage threshold value, wherein the control unit is designed to evaluate the duration of the time from when the voltage drops below the first voltage threshold value up until when the voltage drops below the second voltage threshold value and emits a signal if the time between the fall below the first voltage threshold value up until the fall below the second threshold value falls below a critical time value.

2. The switching device of claim 1, wherein the control unit is designed such that, if it determines that the voltage on the primary side of the power supply unit has dropped below the first voltage threshold value, the control unit is configured to use the energy in the energy store and is configured to:
    switch the semiconductor switch to be electrically conducting and then opens the second switch, and
    subsequently switch the semiconductor switch to be electrically non-conducting, and then opens the first switch.

3. The switching device of claim 1, wherein the control unit is designed to determine, by way of the first measurement device, the voltage on the primary side of the power supply unit and determines the critical time value as a function of the voltage determined.

4. The switching device of claim 1, wherein the energy store is configured to be charged up through the supply connection.

5. The switching device of claim 1, wherein the energy store is designed to ensure the output of the switching signals required for the switching and subsequent switching.

6. The switching device of claim 1, wherein the switching device incorporates a second current path, which incorporates a first electro-mechanical switch and, connected in series with the first switch, a circuit incorporating a second electro-mechanical switch in parallel with a semiconductor switch, wherein the control unit is configured to output a switching signal for the first switch, for the second switch and for the semiconductor switch in the second current path, wherein the control unit is designed to, if the energy supply which is monitored by way of the measurement device drops into a critical range, the control unit is configured to use the energy in the energy store and is configured to:
    switch the semiconductor switch in the second current path to be electrically conducting and then opens the second switch in the second current path,
    subsequently switch the semiconductor switch in the second current path to be electrically non-conducting, and then opens the first switch in the second current path.

7. The switching device of claim 1, wherein the control unit is designed to, in the subsequent switching, switch the semiconductor switch into the electrically non-conducting state as the current for the energy it feeds passes through zero.

8. A system for the safe operation of an electric motor, comprising:
    the switching device of claim 1;
    a supply source; and
    a switching mechanism, wherein the switching mechanism is connected into the supply line from the supply source to the supply connection of the switching device in such a way that, by actuating the switching mechanism, a supply of energy effected from the supply source to the switching device is interrupted.

9. A method for a switching device including a control unit, a supply connection, a power supply unit and a first current path, wherein the first current path incorporates a first electro-mechanical switch and, connected in series with the first switch, a circuit incorporating a second electro-mechanical switch in parallel with a semiconductor switch, wherein the control unit is configured to output a switching signal for the first switch, for the second switch and for the semiconductor switch, wherein the supply connection is linked to the power supply unit and the control unit is configured to draws the energy for the switching signals through the power supply unit, wherein the switching device incorporates an energy store and two measurement devices linked to the control unit, wherein the energy store is connected in between the supply connection and the power supply unit, so that an energy supply for the switching device effected through the supply connection is buffered internally within the device, the method, comprising:
    determining, via the first measurement device, any drop in the supply voltage, present at the primary side of the power supply unit, below a first voltage threshold value; and
    determining, via the second measurement device, any drop in the supply voltage, present at the secondary side of the power supply unit, below a second voltage threshold value;
    evaluating, at the control unit, a duration of the time from when the voltage drops below the first voltage threshold value up until when the voltage drops below the second voltage threshold value; and
    emitting a signal, from the control unit, if the time between the fall below the first voltage threshold value up until the fall below the second threshold value falls below a critical time value.

10. The method for the switching device of claim 9 wherein, after determining that the voltage on the primary side of the power supply unit has dropped below the first voltage threshold value, the control unit, using the energy in the energy store, automatically:
    switching the semiconductor switch to be electrically conducting and then opening the second switch; and
    subsequently switching the semiconductor switch to be electrically non-conducting, and then opening the first switch.

11. The method for the switching device of claim 9, wherein the control unit determines by way of the first measurement device the voltage on the primary side of the power supply unit and determines the critical time value as a function of the voltage determined.

12. The method for the switching device of claim 9 wherein, in the subsequent switching, the control unit switches the semiconductor switch into the electrically non-conducting state as the current for the energy it feeds passes through zero.

13. The method for the switching device of claim 10 wherein, in the subsequent switching, the control unit switches the semiconductor switch into the electrically non-conducting state as the current for the energy it feeds passes through zero.

14. The method for the switching device of claim 11 wherein, in the subsequent switching, the control unit switches the semiconductor switch into the electrically non-conducting state as the current for the energy it feeds passes through zero.

15. The switching device of claim 2, wherein the control unit is designed to determine, by way of the first measurement device, the voltage on the primary side of the power supply unit and determine the critical time value as a function of the voltage determined.

16. The switching device of claim 2, wherein the energy store is configured to be charged up through the supply connection.

17. The switching device of claim 2, wherein the energy store is designed to ensure the output of the switching signals required for the switching and subsequent switching.

18. The switching device of claim 2, wherein the switching device incorporates a second current path, which incorporates a first electro-mechanical switch and, connected in series with the first switch, a circuit incorporating a second electro-mechanical switch in parallel with a semiconductor switch, wherein the control unit is configured to output a switching signal for the first switch, for the second switch and for the semiconductor switch in the second current path, wherein the control unit is designed to, if the energy supply which is monitored by way of the measurement device drops into a critical range, the control unit is configured to use the energy in the energy store and is configured to:

- switch the semiconductor switch in the second current path to be electrically conducting and then open the second switch in the second current path,
- subsequently switch the semiconductor switch in the second current path to be electrically non-conducting, and then open the first switch in the second current path.

19. The switching device of claim 2, wherein the control unit is designed to, in the subsequent switching, switch the semiconductor switch into the electrically non-conducting state as the current for the energy it feeds passes through zero.

20. A system for the safe operation of an electric motor, comprising:
- the switching device of claim 2;
- a supply source; and
- a switching mechanism, wherein the switching mechanism is connected into the supply line from the supply source to the supply connection of the switching device in such a way that, by actuating the switching mechanism, a supply of energy effected from the supply source to the switching device is interrupted.

* * * * *